United States Patent [19]

Uchida et al.

[11] Patent Number: 5,103,365
[45] Date of Patent: Apr. 7, 1992

[54] DOWNED CONDUCTOR AUTOMATIC DETECTING DEVICE

[75] Inventors: Yamato Uchida; Masami Yoko; Shiro Sasaki; Mamoru Kishikawa, all of Saga, Japan

[73] Assignee: Togami Electric Mfg. Co., Ltd., Japan

[21] Appl. No.: 492,515

[22] Filed: Mar. 12, 1990

[30] Foreign Application Priority Data

Nov. 16, 1989 [JP] Japan ............................ 1-299406

[51] Int. Cl.[5] ..................... H02H 7/26; G01R 31/08
[52] U.S. Cl. ......................................... 361/93; 361/7; 361/42; 361/47; 361/63
[58] Field of Search ................. 361/2, 7, 42, 47, 49, 361/63, 93, 1

[56] References Cited

U.S. PATENT DOCUMENTS

| | | | |
|---|---|---|---|
| 3,911,323 | 10/1975 | Wilson et al. | 361/42 |
| 4,004,201 | 1/1977 | DePoy | 361/47 |
| 4,466,071 | 8/1984 | Russell | 364/492 |
| 4,607,309 | 8/1986 | Bishop | 361/63 |
| 4,672,501 | 6/1987 | Bilac et al. | 361/42 |
| 4,713,604 | 12/1987 | Becker et al. | 361/42 |
| 4,955,069 | 9/1990 | Ionescu | 361/93 |

FOREIGN PATENT DOCUMENTS

| | | | |
|---|---|---|---|
| 0200056 | 3/1983 | German Democratic Rep. | 361/1 |
| 0224157 | 6/1985 | German Democratic Rep. | 361/42 |
| 0534007 | 10/1976 | U.S.S.R. | 361/42 |

OTHER PUBLICATIONS

"Development of a Dedicated Microprocessor Protection Relay", by E. Horne, B. Cory, L. Petnou, 1979 IEEE.

"Design Consideration in the Development of a New Ground Distance Relay", by Wilkinson, Mathews & Keeney, (9/10)/79 IEEE Transactions.

"Protection of Neutral-Beam-Accelerator Electrodes from Spark Discharges", by W. Praeg, Conference, Proceedings of 7th Symposium, Oct. 25-28, 1977.

Primary Examiner—Steven L. Stephan
Assistant Examiner—Thomas M. Dougherty
Attorney, Agent, or Firm—Jordan and Hamburg

[57] ABSTRACT

A device for detecting and isolating a downed conductor in a three-phase four-wire multi-grounded distribution system. The device cooperates with a power supply protective device if the device has a breaking capacity less than the maximum prospective short-circuit current of the distribution line, and the device is installed at a tap point of the distribution line. The device comprises a current detector, a low-pass filter, a high-pass filter, an arcing ground fault current-detecting circuit, a first overcurrent-detecting circuit that delivers an output when the output current from the low-pass filter exceeds a given value, a second overcurrent-detecting circuit that detects an overcurrent exceeding the breaking capacity of a device which has a breaking capacity less than the maximum prospective short-circuit current of the distribution line, a no-voltage detecting circuit for sensing that the distribution line is not electrically charged, a main contact and a trip mechanism. This trip mechanism opens the device either when the no-voltage detecting circuit produces an output after the second overcurrent detecting circuit produced an output or when the arcing ground fault current-detecting circuit or the first overcurrent-detecting circuit produces an output when the second overcurrent-detecting circuit produces no output.

1 Claim, 6 Drawing Sheets

DOWNED CONDUCTOR AUTOMATIC DETECTING DEVICE

BACKGROUND OF THE INVENTION

1. Field of the Invention

The present invention relates to a device which is capable of automatically detecting a downed conductor in a three-phase four-wire multi-grounded distribution system and which acts to protect the line from arcing ground faults and overcurrents.

2. Prior Art

Fuses, breakers, sectionalizers, and automatic reclosers are conventional protectors of this kind which operate when the distribution lines allow overcurrents. These protectors can detect overcurrents when the overcurrents exceed the operating currents of the protectors. However, the conventional protectors cannot always protect the downed conductor in the three-phase four-wire multi-grounded distribution system.

The present applicant has already disclosed a new branch device in Japanese Patent Publication No. 38089/1982 in use for a three-phase three-wire ungrounded distribution system. This branch device comprises a no-voltage detecting circuit to lock in the branch device which has a breaking capacity less than the maximum prospective short-circuit current of the distribution line and to open the branch device under no-voltage conditions of the distribution line, an overcurrent detecting circuit for detecting an overcurrent which exceeds the breaking capacity of the device, a first activating circuit for activating a trip mechanism, a second activating circuit which is charged by operation of the overcurrent detecting circuit and has a given power circuit to the tripping mechanism, and a relay. When the no-voltage detecting circuit operates, the relay is energized by the second activating circuit and operated for a given time if the overcurrent detecting circuit is operated. When the overcurrent detecting circuit does not operate, the trip mechanism is activated by the operating relay to open the branch device. In this case, operation of the no-voltage detecting circuit is not involved to any operation of the branch device.

When this branch device locks in, if a large current flows, the device is opened after associated source side protective device opens and under no-voltage condition of the line. If no large current flows, i.e., the current is less than the predetermined operating current of the overcurrent detecting circuit, then the branch device opens immediately to isolate the branch circuit. Therefore, the electric power is continuously supplied to all healthy sections without any interference. The power failure section is limited to only the faulty section. Hence, it can increase the reliability of the power supply. In addition, it is easy to discover a faulty point. Moreover, the branch device is not required to interrupt abnormal high short-circuit current and is capable of using an inexpensive device which does not need high-breaking capacity of the maximum prospective short-circuit current of the distribution line.

An arcing ground fault current which is one of abnormal currents has a unique ground fault phenomenon. In particular, when a distribution line breaks and falls down to the ground, an arc jumps to the ground but the fault currents are restricted. These faults are described as high impedance faults at the point of the fault. This impedance is often sufficient to restrict current flow values which are low fault levels. From the above example, the ordinary overcurrent protection devices do not protect such high impedance faults. Therefore, some faults will remain undetected and the power supply is resumed. If such an undesirable phenomenon is not remedied, the downed conductors could prove fatal if they come into contact with a human being. Further, fire or other serious accidents may occur.

When the above-described arcing ground fault occurs, it is common practice to disregard the abnormal current, permitting the persistence of supply of electric power, because the current is less than the operating current of the protective devices. In a three-phase three-wire ungrounded distribution system, the abnormal current can be detected by the method described in the above-cited Japanese Patent Publication No. 38089/1982.

In the U.S.A., R.O.C., South Korea and other regions, three-phase four-wire multi-grounded distribution systems are adopted, since no abnormal voltage is produced when a ground fault occurs, permitting the insulation level of a transformer or other device to be made lower than the insulation level used when a three-phase three-wire ungrounded system is employed. In three-phase three-wire ungrounded systems which are widely adopted in Japan for lines through which voltages less than 30 kV, the magnitude of ground fault currents are relatively low value but the ground fault currents can be detected and can be distinguished from load currents. The ground fault current can be detected properly only by a core-balanced current transformer which can sense the ground fault current. On the other hand, in the three-phase four-wire multi-grounded distribution system, it is impossible to connect a core-balanced current transformer to a tap point of the distribution line to sense the ground fault current since there is only one power distribution line, and therefore the core-balanced current transformer cannot sense the ground fault current. In order to sense the ground fault current with a core-balanced current transformer, it is necessary to pass both line and load conductors through the core-balanced current transformer to measure an unbalanced current which is the ground fault current.

In 3-phase four-wire multi-grounded distribution systems, it is difficult to distinguish ground fault currents from load currents. Depending on the location at which a ground fault occurs, the amplitude of the current may be comparable with a load current or even with a large short-circuit current. Therefore, if the detectable level is lowered to detect weak current such as an arcing ground fault current of about 1 ampere, then the device is tripped at normal load currents, thus presenting problems. If the detectable level is increased to prevent the device from being tripped at normal load currents, then no arcing ground fault currents can be detected.

SUMMARY OF THE INVENTION

Accordingly, it is an object of the present invention to provide a device which protects a distribution line of the three-phase four-wire multi-grounded distribution system and is capable of detecting arc currents intrinsic in arcing ground faults to certainly detect a downed conductor in a branch circuit and to isolate it.

The above object is achieved in accordance with the teachings of the invention by a device for automatically detecting an isolation in a distribution line, said the device comprising: a current detector for detecting the electric current flowing through a three-phase four-wire multi-grounded distribution line; a first filter that passes those frequencies of the output current from the current detector which lie in the power frequency range; a second filter that passes those frequencies of the output current from the current detector which are much higher than the power frequency range; an arcing ground fault current-detecting circuit which produces a signal indicating an arcing ground fault when the output current from the second filter exceeds a predetermined value; a first overcurrent-detecting circuit which produces a signal indicating an overcurrent when the output current from the first filter exceeds a predetermined value; a second overcurrent-detecting circuit which detects an overcurrent exceeding the breaking capacity of a device; a no-voltage detecting circuit which senses that the distribution line is not electrically charged; and a trip mechanism for opening the device either when the no-voltage detecting circuit produces an output signal after the second overcurrent-detecting circuit produces an output signal or when the arcing ground fault current-detecting circuit or the first overcurrent-detecting circuit produces an output signal while the second overcurrent-detecting circuit produces no output signal.

Other objects and features of the invention will appear in the course of the description thereof which follows.

DETAILED DESCRIPTION OF THE INVENTION

Figure 1:
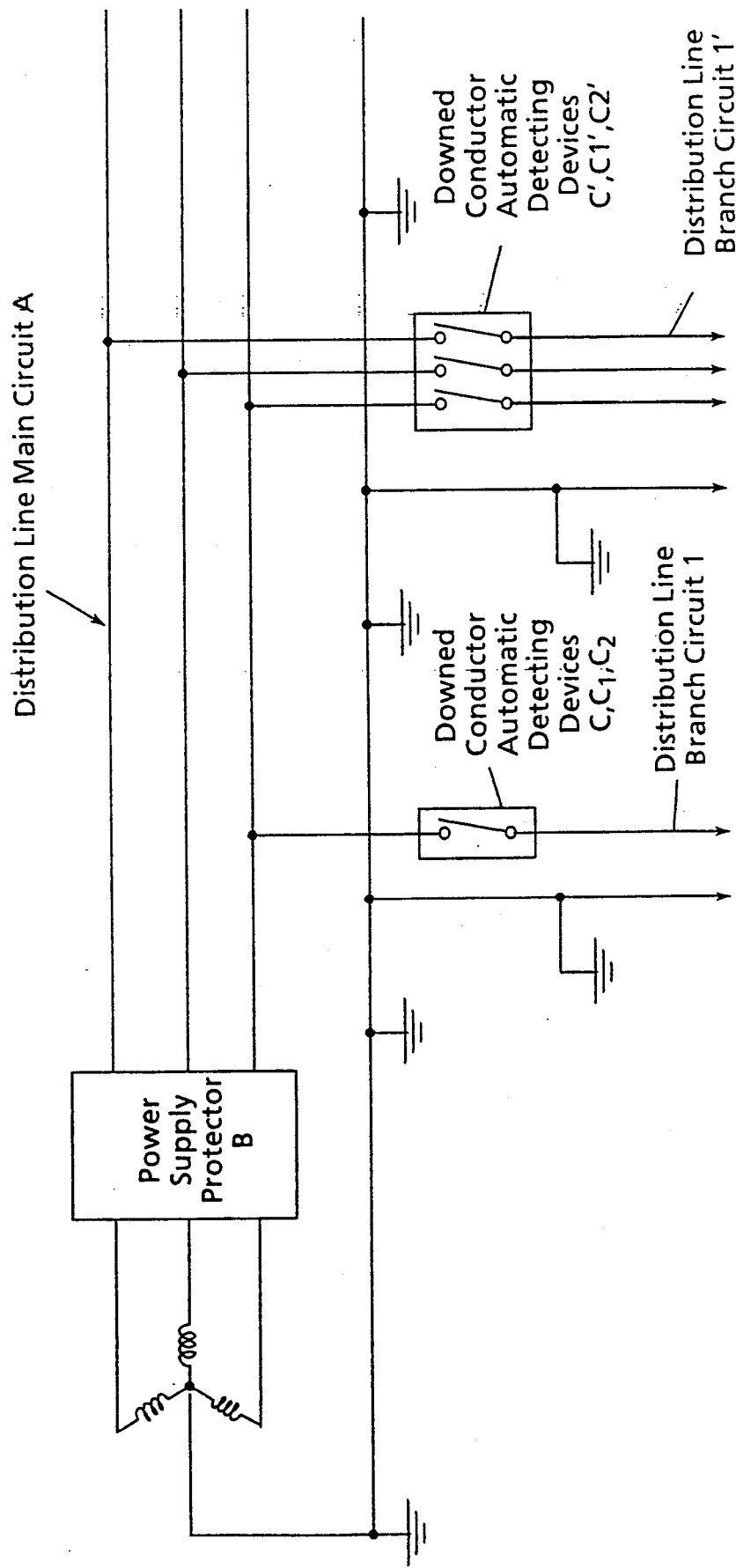
FIG. 1 is a connection diagram of a device for use with a three-phase four-wire multi-grounded distribution system, the device being built in accordance with the invention.

Referring to FIG. 1, there is shown a distribution line of the three-phase four-wire multi-grounded distribution system. This distribution line comprises a distribution line main circuit A of the three-phase four-wire multi-grounded distribution system, a power supply protective device B installed in, for example, a substation, a downed conductor automatic detecting device C installed at a tap point 1 of the distribution line main circuit A for single-phase distribution system, and another downed conductor automatic detecting device C' installed at a tap point 1' of the distribution line main circuit A.

Figure 2:
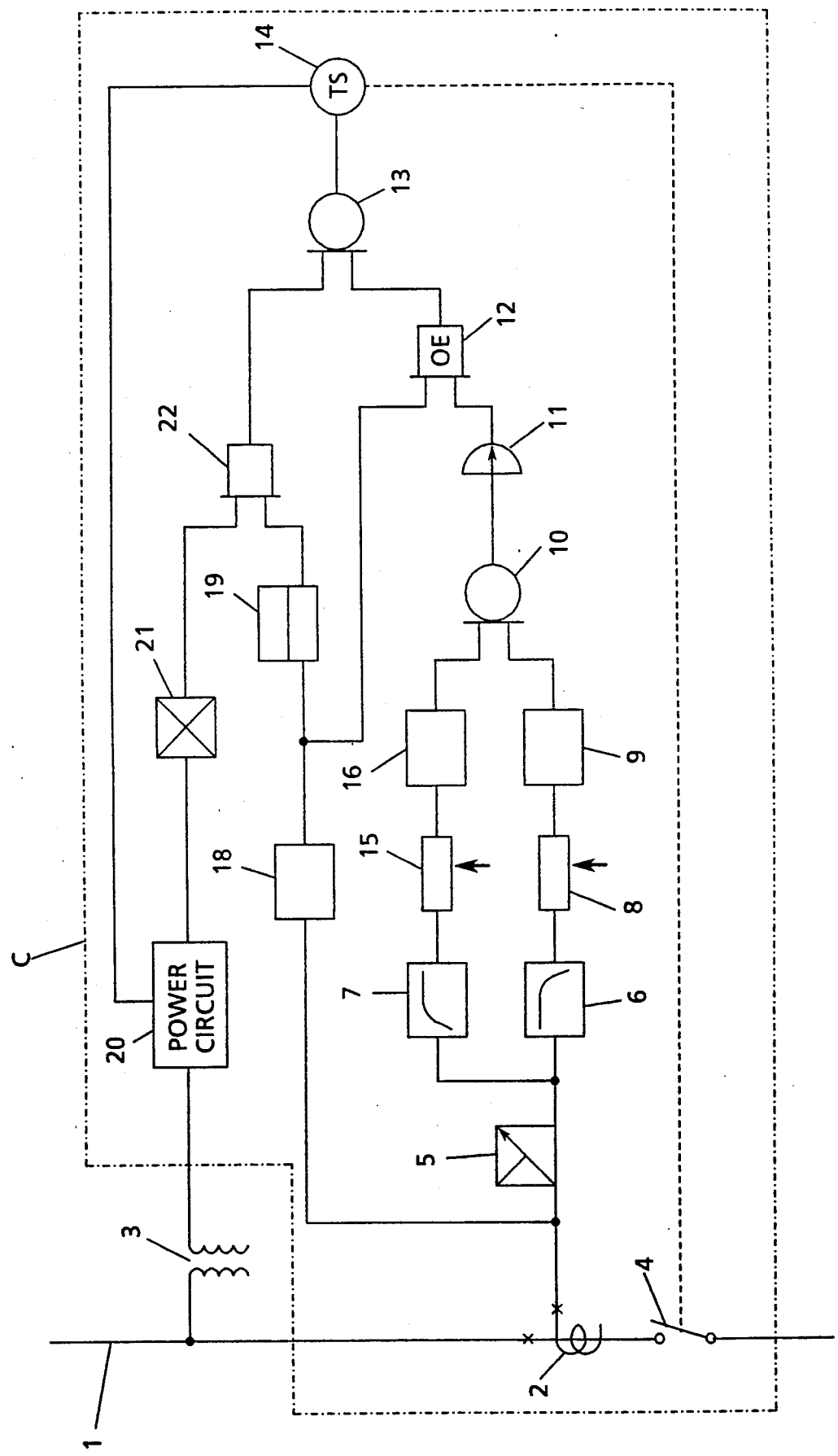
FIG. 2 is a block diagram of a device according to the invention.

The configuration of the downed conductor automatic detecting device C is shown in FIG. 2. This device C comprises a current detecting device 2, such as a current transformer, for detecting electric current flowing through the distribution line branch circuit 1 of the single-phase distribution system, and an external transformer 3, the transformer acting to give the operation voltage from the branch circuit 1. A device has a main contact 4.

The electric current detected by the current detecting device 2 is enlarged by an amplifier 5 and passed through a low-pass filter 6 or a high-pass filter 7. The low-pass filter passes frequencies lying in the power frequency range of up to 100 Hz. The high-pass filter passes frequencies much higher than the power frequency range. The high-pass filter 7 serves to detect arcing ground fault currents. Data obtained by examining arcing ground faults shows that ground fault currents are less than tens of amperes and most of them are less than 10 amperes. However, the arcing ground fault currents contain a certain high frequency noise current, and the frequencies of these currents are between 2 kHz and 20 kHz. Therefore, in the present example, the by-pass frequency, so that the device can protect against the arcing ground faults by detecting the high frequency noise current is set to 1.5 kHz and above frequencies.

The low-pass filter 6 acts to detect overcurrents. The current sensitivity at which a tripping operation is performed is set to 16, 25, 40, 63 or 100 amperes by a sensitivity adjuster 8. If the set current value is surpassed, a comparator 9 produces an output signal to an OR circuit 10. A timer 11 is connected to the output of the OR circuit 10 to prevent malfunction if an unwanted inrush current flows through the transformer or the motor or if a flash-over is caused by lightning. The timer 11 delivers an output signal after a lapse of a given time, say between 0.2 and 0.5 second. The output signal from the OR circuit 10 energizes a trip solenoid 14 via the timer 11, an inhibit circuit 12, and an OR circuit 13 to open the main contact 4 of the device.

The output signal from the high-pass filter 7 is compared with the current value, for example 1 ampere, set which can be used as an aid to protect against the arcing ground faults, by a sensitivity adjuster 15, by means of a comparator 16. If the detected arcing ground fault current exceeds that current value, then an output signal is delivered to the OR circuit 10. After a lapse of a given time, for example between 0.2 and 0.5 second, the trip solenoid 14 is energized via the timer 11, the inhibit circuit 12, and the OR circuit 13 to open the main contact 4 of the device.

The current detected by the current detecting device 2 is also applied to an overcurrent detecting circuit 18. If the detected current exceeds a predetermined range of 800−100 amperes to 800+100 amperes, for example, then the detecting circuit delivers an output indicating an abnormal overcurrent. This output signal is stored in a memory 19. If such an overcurrent flows through the distribution line 1, then the power supply protective device B operates to interrupt the abnormal current.

When no voltage is applied across the distribution line 1, the voltage applied to the power circuit 20 connected to the secondary side of the transformer 3 is not available. The no-voltage detecting circuit 21 operates at this time. Since the memory 19 recognizes that an overcurrent has flowed, if the AND condition of an AND circuit 22 is met, then the trip solenoid 14 is then activated via the OR circuit 13 to open the main contact of the device.

More specifically, the electric power through the high-voltage distribution line 1 is allowed after a lapse of a given period by an automatic recloser (not shown) or the like, and the electric power is supplied in all healthy sections, since the main contact 4 of the device is open and locked out.

The inhibit circuit 12 is provided to give priority to the output signal from the overcurrent-detecting circuit 18 when this circuit is in operation, for performing the above-described processing. The operating voltage can be taken from the transformer 3. Also, a current transformer or other power supply such as a battery can be used.

Figure 3:
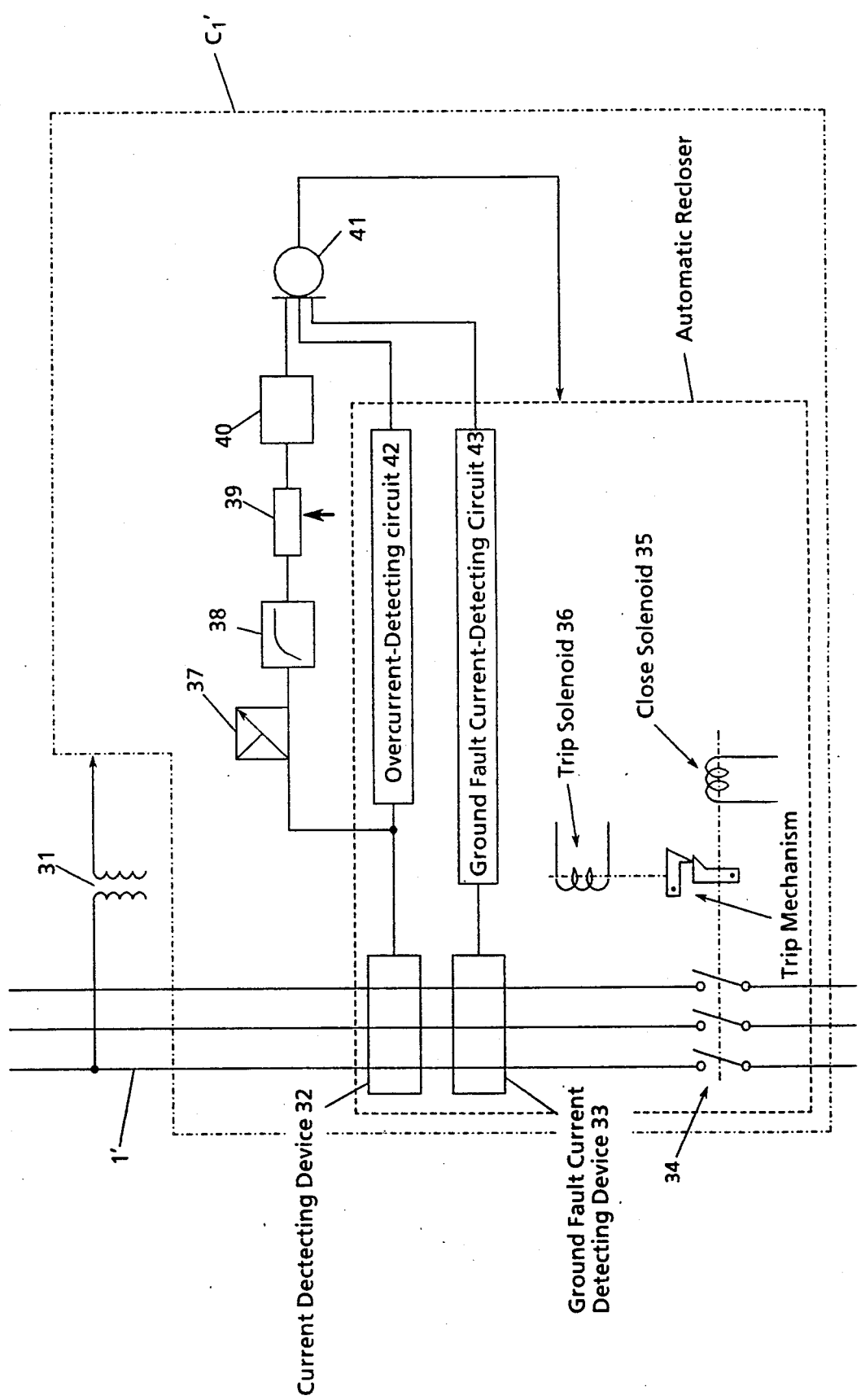
FIGS. 3-6 are block diagrams of other devices according to the invention.

FIG. 3 is a block diagram showing the structure of a downed conductor automatic detecting device C1' which is equipped with an automatic recloser and installed in a tap point of three-phase four-wire multi-grounded distribution line branch circuit 1'. In this example, operating power is taken by connecting an external transformer 31 with the branch circuit 1'. A current detecting device 32 and a ground fault current detecting device 33 are connected with the branch circuit 1'. A device has a main contact 34 which is closed by a closing solenoid 35 and opened by a trip solenoid 36.

The electric current detected by the current detecting device 32 is enlarged by an amplifier 37 and passed through a high-pass filter 38 which passes frequencies much higher than the power frequency. The filter 38 acts to detect arcing ground fault currents, and its by-pass frequency is set to 1.5 kHz and above frequencies. The output signal from the filter 38 is compared with the current, for example 1 ampere, set by a sensitivity adjuster 39, by means of a comparator 40. If the detected arcing ground fault current exceeds the set value, an output signal is delivered to an OR circuit 41 to energize the trip solenoid 36, for opening the main contact 34 of the device.

Those currents which are detected by the current detecting device 32 and have frequencies lying in the power frequency range are detected by an overcurrent-detecting circuit 42. If an overcurrent exceeding a predetermined current value is detected, an output signal is given to the OR circuit 41 to energize the trip solenoid 36, thus opening the main contact 34 of the device.

The ground fault current detected by the ground fault current detecting device 33 is applied to a ground fault current-detecting circuit 43. If a ground fault current exceeding a predetermined level is detected, an output signal is given to the OR circuit 41 to thereby energize the trip solenoid 36. As a result, the main contact 34 of the device is opened.

Figure 4:
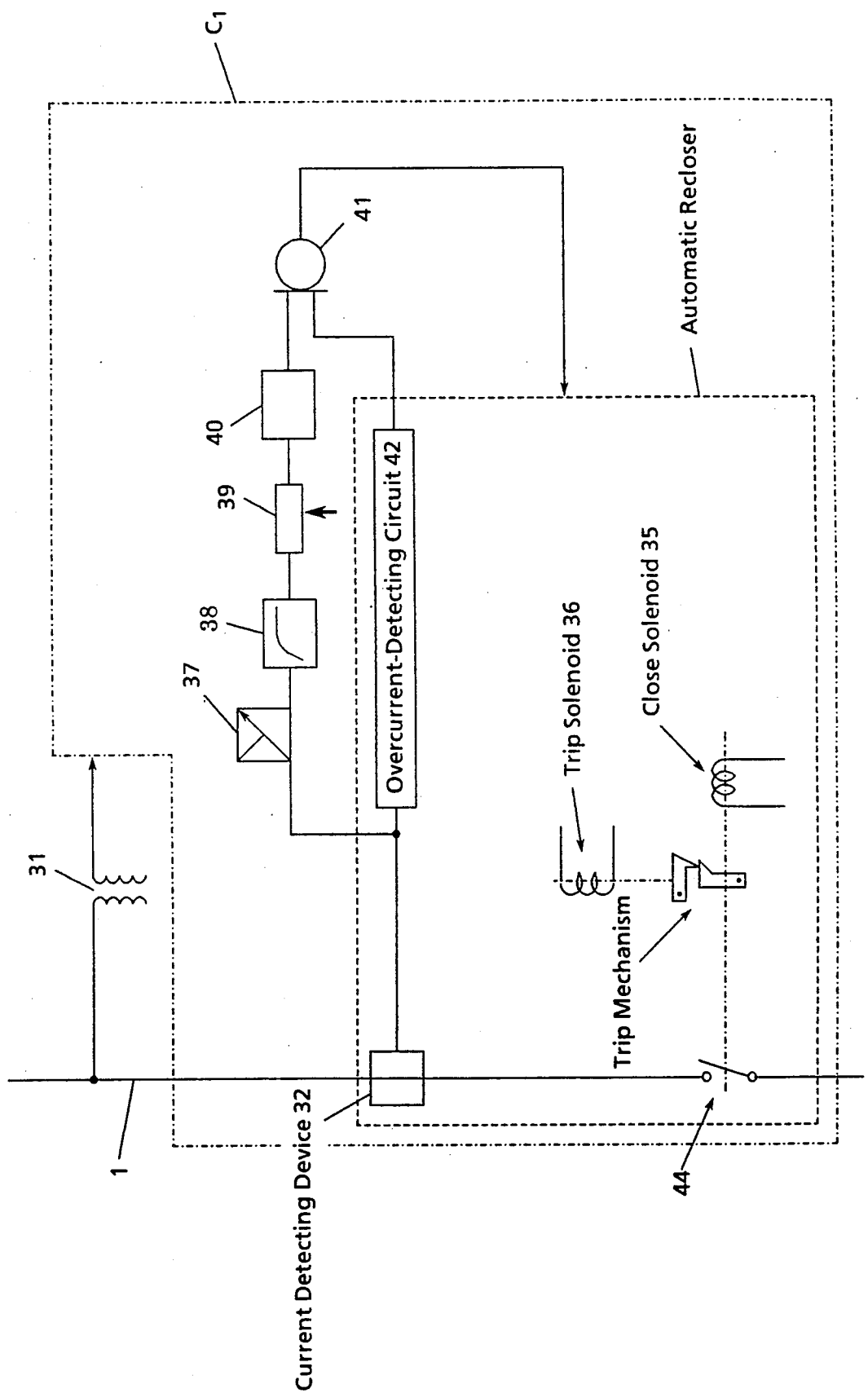

Referring next to FIG. 4, there is shown an example of the downed conductor automatic detecting device C1 which is installed in the single-phase distribution line branch circuit 1 and equipped with an automatic recloser. In this example, the ground fault current detecting device 33 and the ground fault current detecting circuit 43 are omitted. When an overcurrent or an arcing ground fault current is detected, the main contact 44 of the device is opened. In other respects, this example is similar in configuration and operation to the example shown in FIG. 3 and so these similar points will not be described.

Figure 5:
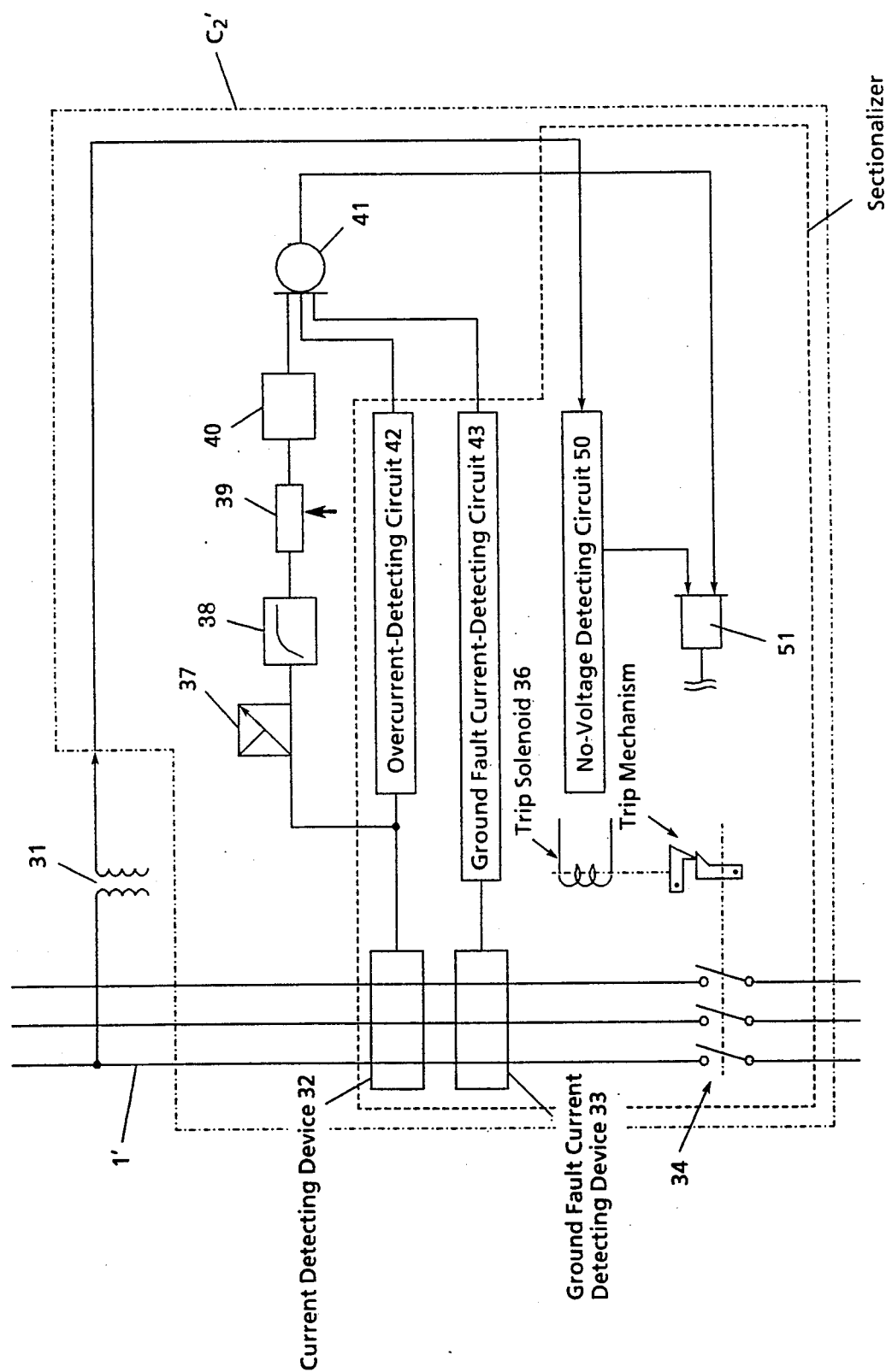

FIG. 5 is a block diagram of a downed conductor automatic detecting device C2' which is installed in a three-phase four-wire multi-grounded distribution line branch circuit 1' and equipped with a sectionalizer. In the present example, the voltage applied across the distribution line branch circuit 1' is detected in the secondary side of an external transformer 31. A no-voltage detecting circuit 50 detects the presence or absence of a voltage. The output from the no-voltage detecting circuit 50 and the output from the OR circuit 41 (described in FIG. 3) are applied to an AND circuit 51. When both output signals are present, the trip solenoid 36 is energized to open the main contact 34 of the device. That is, the trip mechanism is activated only when the voltage across the branch circuit 1' is not available even if an arcing ground fault current, an overcurrent, or a ground fault current is detected.

Figure 6:
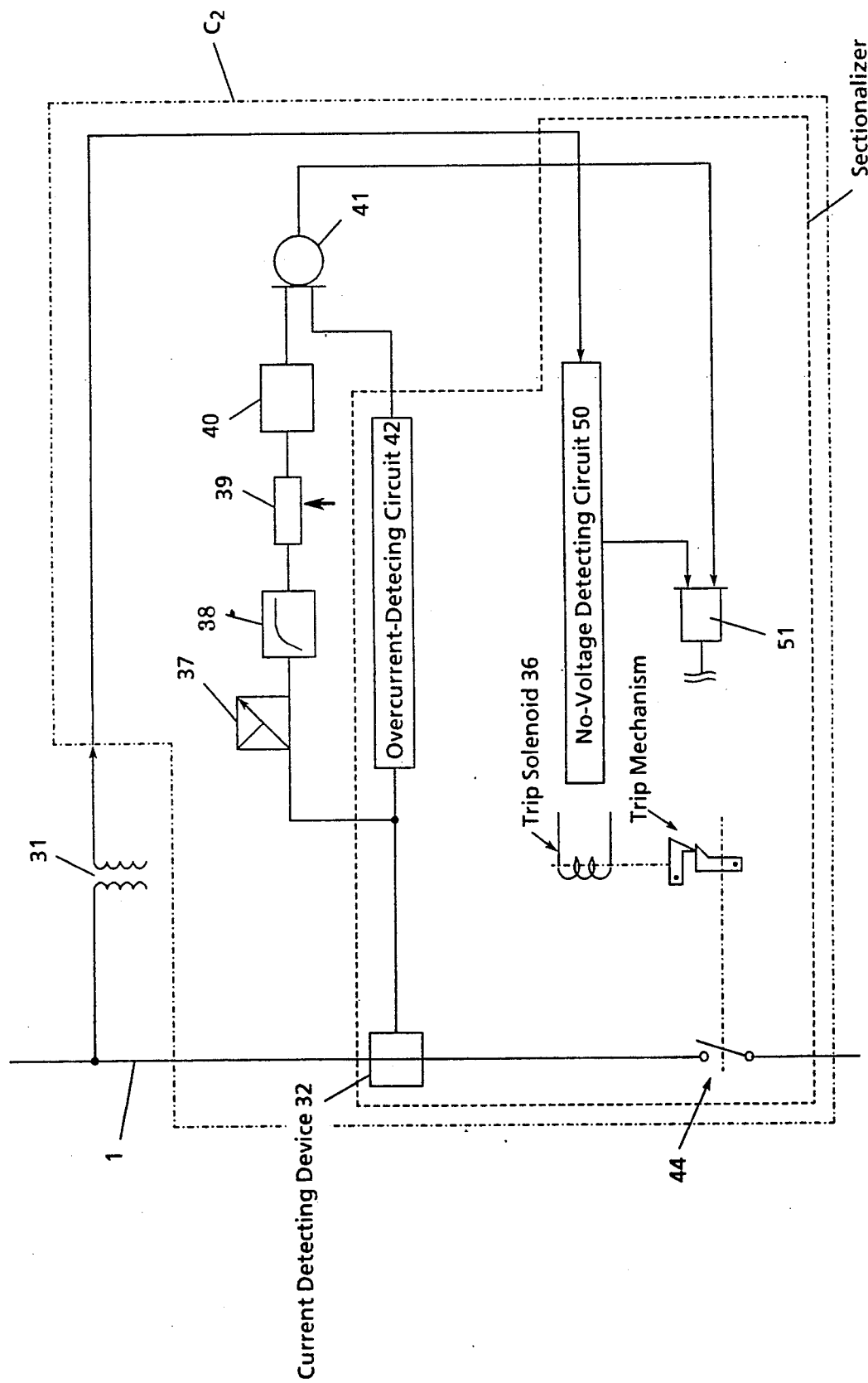

FIG. 6 is a block diagram of downed conductor automatic detecting device C2 which is installed in a single-phase distribution line branch circuit 1 and equipped with a sectionalizer. This example is similar in structure and operation to the example shown in FIG. 5 except for the following points. The ground fault current detecting device 33 and the ground fault current detecting circuit 43 are omitted. If an overcurrent or an arcing ground current is detected, and if the absence of a voltage is detected, the main contact 44 of the device is opened.

The functions of the sectionalizer and the automatic recloser are now described. The sectionalizer is used as a device which automatically isolates a distribution line equipped with the automatic recloser. The sectionalizer cooperates with the automatic recloser to isolate a permanent fault and to restrict the faulty section.

The sectionalizer is installed on the load side of a back-up protector (automatic recloser) and detects and records an abnormal current flowing through the sectionalizer. The sectionalizer can be so set up that it is opened after the first, second or third trip action is performed. The automatic recloser can make one, two, three or four counting. The numbers of counting can be set at will. After the final trip that has been set, the reclosing mechanism of the automatic recloser is locked out. The sectionalizer isolates the faulty section after the automatic recloser interrupts the abnormal current. That is, the sectionalizer does not interrupt abnormal current.

If a permanent fault occurs, the sectionalizer records the numbers of flowing overcurrents made by the automatic recloser according to the fault, as well as the number (1, 2 or 3) of repeated operations set into the sectionalizer. Then, the sectionalizer opens to isolate the faulty section. The sectionalizer cannot be closed unless operated by manually.

Where a temporary fault occurs, if the situation is remedied before the numbers of repeated operations set into the sectionalizer is reached, then the numbers of flowing overcurrents recorded in the sectionalizer cancels after a lapse of a given time, i.e., after the total count is reset.

The sectionalizer must sense every interruption performed by the back-up automatic recloser in response to a fault. Thus, the sectionalizer senses phase faults and ground faults. As an example, 8 taps are assigned to a phase fault current, while 10 taps are assigned to a ground fault current.

Selection of a detected abnormal current and setting of the number of repeated operations for opening the sectionalizer are performed by a control box or the like.

As described thus far, in accordance with the invention, detection of an arcing ground fault and a downed conductor occurring in a three-phase four-wire multi-grounded distribution system can be performed, as well as detection of an overcurrent, and an isolating operation of the device. Electric power can be restarted while restricting the faulty section. Additionally, accidents to human being and fires can be prevented. The novel device can be installed without modifying the conventional distribution system. Hence, greater economy of cost can be attained.

What is claimed is:

1. A device for automatically detecting a downed conductor, said device being adapted to cooperate with a power supply protective device, and installed at a tap point of a distribution line, comprising:

a current detecting means for detecting the electric current flowing through a three-phase four-wire multi-grounded distribution line;

a first filter connected to pass those frequencies of the output current from the current detecting means which lie in the power frequency range;

a second filter connected to pass those frequencies of the output current from the current detecting means which are 1.5 kHz and above;

an arcing ground fault current-detecting circuit connected to produce a signal indicating an arcing ground fault when the output current from the second filter exceeds a predetermined value;

a first overcurrent-detecting circuit connected to produce a signal indicating an overcurrent when the output current from the first filter exceeds a predetermined value;

a second overcurrent-detecting circuit connected to detect an overcurrent exceeding the breaking capacity of the device, said device having a breaking capacity less than the maximum prospective short-circuit current of the distribution line;

a no-voltage detecting circuit connected to sense that the distribution line is not electrically charged; and a main contact and a trip mechanism connected to open the device either when the no-voltage detecting circuit produces an output signal after the second overcurrent-detecting circuit produces an output signal or when the arcing ground fault current-detecting circuit or the first overcurrent-detecting circuit produces an output signal when the second overcurrent-detecting circuit produces no output signal.

* * * * *